United States Patent Office 3,703,396
Patented Nov. 21, 1972

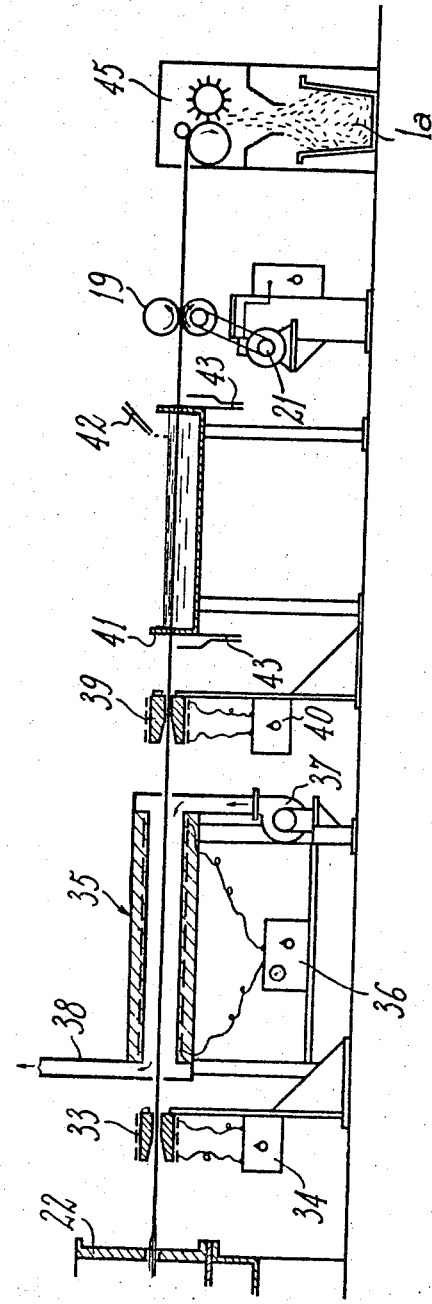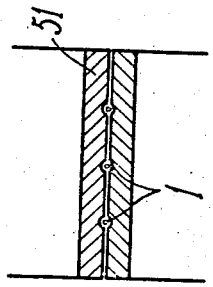

3,703,396
APPARATUS FOR MANUFACTURING PRODUCTS COMPOSED OF FIBERS AGGLOMERATED WITH SYNTHETIC RESINS
Jean Lamanche, La Ravoire, and Gerard Buisson, Chambery, France, assignors to Compagnie de Saint-Gobain, Neuilly-sur-Seine, Seine, France
Filed Feb. 2, 1970, Ser. No. 7,639
Claims priority, application France, Feb. 5, 1969, 6902522
Int. Cl. B44d 1/094; B32b 5/16
U.S. Cl. 117—21
4 Claims

ABSTRACT OF THE DISCLOSURE

The production of running lengths of hardened compounds of fibers thoroughly impregnated with synthetic resin, which may be cut into small fragmentary pieces adapted to serve as a charge for molding plastic bodies with a fiber reenforcement. The strands of the fibers are reeled from a supply, and the individual fibers are separated from each other by air currents or electrostatic charges of the same polarity. Synthetic resin in powdered form is applied to the separated fibers to effect a thorough intermingling between them which is followed immediately by a preliminary heating of the composite product to effect a fusing of the resin with the fiber component. This fusing is followed by a more intense heating and shaping of the composite product into continuous reeds, which, after cooling and hardening may be cut up into small pieces of any desired size. A special feature of the invention resides in separating the fibers of the strands from one another by applying an electrostatic potential of the same polarity to the fibers to produce a repulsive force therebetween, and by applying an electrostatic potential of opposite polarity to the powdered particles of the resin, to induce an attractive force between these particles and the fibers, and the ultimate thorough fixation of these particles onto the fibers, in consequence of the heating and molding thereof by their passage through the openings in heated spinnerets or analogous heating and shaping devices.

---

The present invention relates to the manufacture of composite products formed of fibers which are agglomerated by means of synthetic resins.

It is the object of the invention to provide a method of separating the assembly of fibers, joined together in the form of threads or strands, applying a synthetic resin in the form of powder onto these individual fibers, and effecting the fusion of the resin immediately after this application, followed by the shaping and cooling of the product.

It is within the contemplation of the invention to effect the separation of the individual fibers of the assembly of threads or strands by subjecting the latter to an electrostatic charge of the same polarity and, simultaneously, to impose an electrostatic charge of opposite polarity relative to the former, to the pulverulent synthetic resin, which causes the latter to come into close contact with the individual fibers and to become affixed thereto.

The instant invention makes possible the obtention of composite products in which the fibrous support is impregnated with resin on the surface as well as at the core. On the other hand, the invention serves to eliminate the difficult, dangerous and burdensome conditions arising from the impregnation of the fibers in a solvent medium or in an aqueous emulsion.

It is another object of the invention to provide for the manufacture of continuous reeds having a glass fiber base, particularly the silicon type, with thermoplastic or heat-hardening synthetics, these continuous reeds then being adapted to be cut into small elements which may be used directly for the manufacture of molded pieces, or as base mixtures to which may be added synthetic resins in suitable amounts, depending upon the mechanical characteristics sought to be obtained in the final products.

The following products, simply by way of illustration, may be obtained by the process according to the invention: granules of thermoplastics reenforced with long fibers, in any desired proportions of reenforcements and resin; dry heat-hardening compounds; reeds for cables, hooping, or for use in molding processes by winding; and flat or tubular forms, of any desired sections.

The fibers constituting the reenforcement may be fibers of glass, rock, asbestos, boron, graphite, carbon, silica, silicon carbide, as well as artificial or synthetic fibers having a softening point higher than the softening point of the synthetic resins which may be used in the composite product.

The thermoplastic resins which may be used may be selected from the following: vinyl polymers, such as polystyrene, the copolymers of styrene and other monomers, particularly acrylonitrile and butadiene, the high and low pressure polyethylenes, polypropylene and copolymers of propylene and ethylene, polyvinyl chloride and copolymers of vinyl chloride, methyl polymethacrylate and copolymers of methacrylic or acrylic esters, the products of polyaddition or polycondensation such as the polyamides, for example, polycaprolactame or the homopolymers and copolymers of other lactames, hexamethylenediamine polycarbonates, polyphenyline oxide, cellulose derivatives such as for example cellulose acetate, etc.

The heat-hardening resins may be selected from the aminoplasts, phenoplasts, epoxides, alkyds, etc.

Mixtures of thermoplastic resins and heat-hardening resins may also be used.

The percentage of fibers relative to the synthetic resin may vary widely. However, since the purpose of the invention is to obtain composite products in which the resin is distributed homogeneously throughout the mass, whatever may be the relative weight of the fibrous reenforcement in the product, it is practically advantageous that the percentage of fibers be not below 20%. As indicated above, the products of high fiber content may be adapted to all uses by employing them in a mixture with additional resins, depending upon the mechanical characteristics sought for the articles which are manufactured.

In the case of glass fibers in particular, these are previously coated with a lubricant during their working for the purpose of conserving the mechanical characteristics which are necessary for the execution of the process.

Other objects and advantages of the invention will appear from the description below of several preferred embodiments of the invention, which are by way of example only and which are illustrated in the accompanying drawings, wherein:

FIG. 2b is a front elevation of the last part of the installation shown in FIG. 2a;

Figure 5:
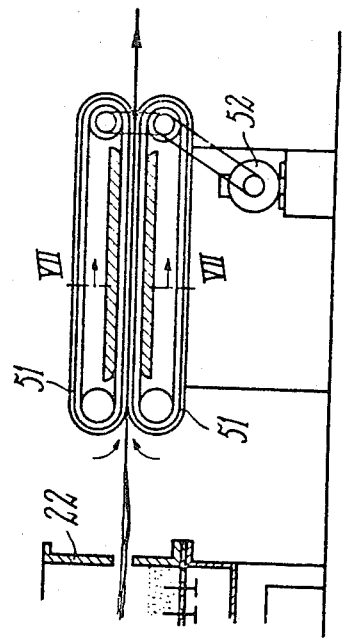
Figure 4:
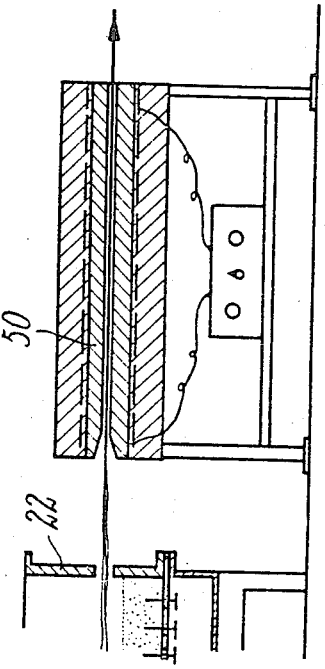
Figure 6:
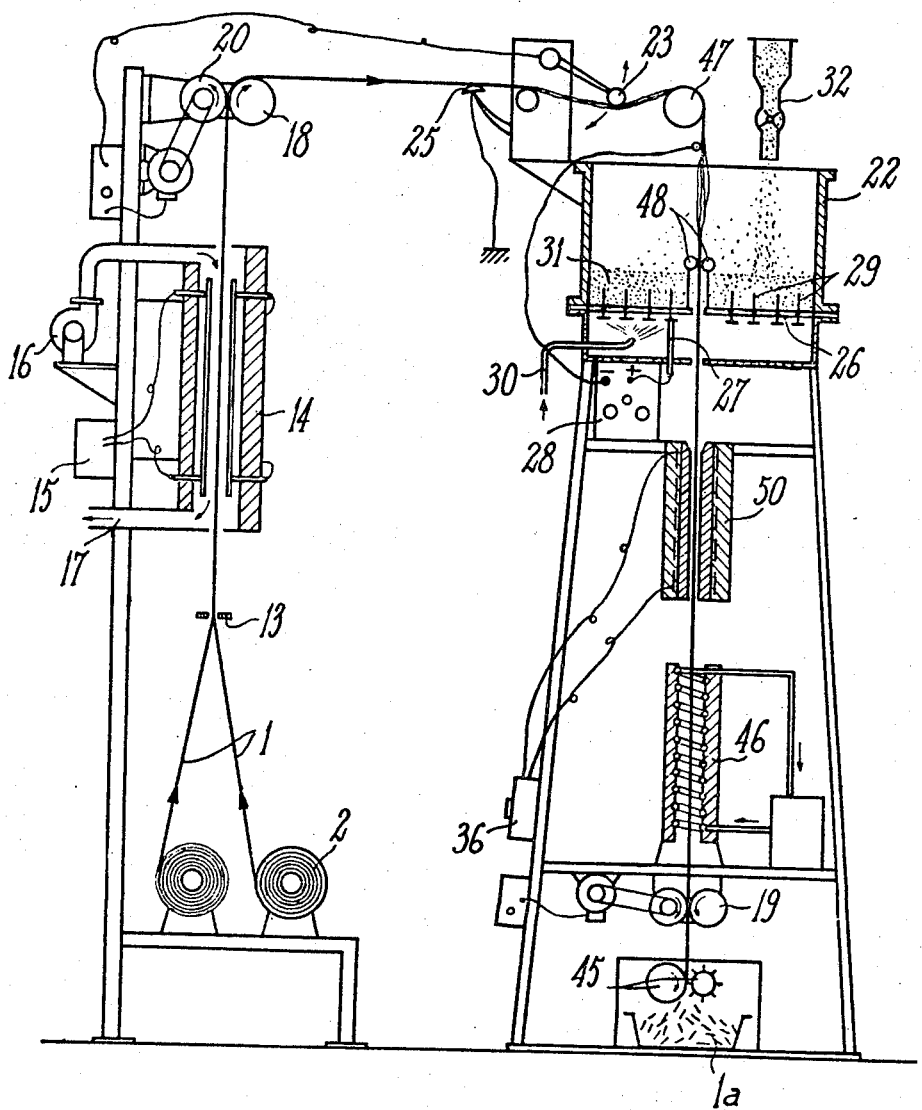

FIG. is a plan view of the arrangement for supplying threads or strands at the inlet end of the apparatus;

FIGS. 4 and 5 are front elevations, with certain parts in section, of two different embodiments of ovens for effecting the fusion of the resin and shaping the product following the application of the powdered resin onto the separated fibers;

FIG. 6 is a front elevation of another embodiment of the invention which utilizes an electrostatic field; and FIG. 7 is a vertical sectional view along line VII—VII of FIG. 5.

In the drawings are illustrated several installations which are designed for the production of reenforced granules of thermoplastic resins. In each case, one begins with wicks or strands of filaments 1 assembled in parallel or with unitary threads. These strands may be unrolled from one or more supply reels or bobbins 2. The constituent fibers of these strands or threads may be coated with a lubricating composition which may advantageously have the following formulation:

|  | Percent by weight |
| --- | --- |
| Vinyl acetate | 5 |
| Butyl phthalate | 0.75 |
| Amine type lubricant | 0.7 |
| γ-Aminopropyltriethoxysilane | 0.3 |
| Acetone | 1 | with slight quantities of soft water, acetic acid and ammonia for adjusting the pH of the composition.

Figure 1:
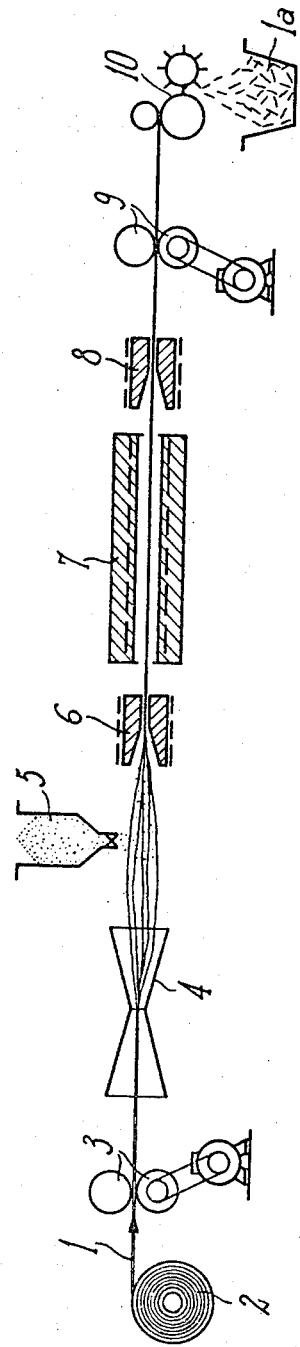
FIG. 1 is a front elevation of an installation according to the invention.

In the embodiment shown in FIG. 1, the strands pass between delivery rollers 3 and traverse a Venturi nozzle 4 through which is run a fluid at high speed. Under the action of the expansion of this fluid, the strands leave the Venturi in the open state, that is to say, the fibers composing them separate from one another. The separated fibers of the strands then present themselves in the open state under a distributor 5 of powdered synthetic resin. The fibers, with the powdered resin now incorporated throughout the mass, then pass into a heated spinning nozzle 6, which, for example, may be heated electrically, to fuse immediately the fibers and resin particles.

The fused ribbons then pass through an oven 7, which may be heated by electric resistances supplied by a source of current, with regulation and control of its temperature by suitably located thermocouples. Upon leaving oven 7, the strands pass through a heated spinneret or spinning nozzle 8 for forming or shaping the fused lengths of material and to impart to the hot composite compounds of resin and fiber the forms of reeds. Also, the nozzle 8 may be heated by electric resistances. The strands, which are thoroughly impregnated with resin, even to the core or center thereof, next pass between entraining rollers 9 and are finally fed to a cutting or granulating device 10 for producing small fragments or granules 1a of predetermined size.

Figure 2A:
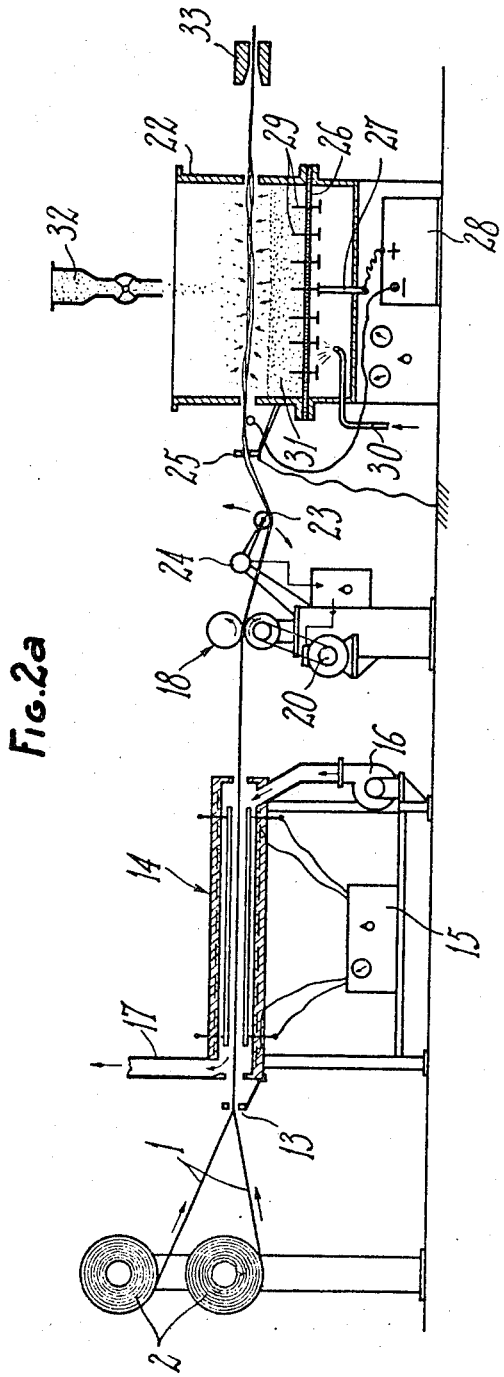
FIG. 2a is a front elevation of the first part of another embodiment of the invention featuring the use of electrostatic energy.
Figure 3:
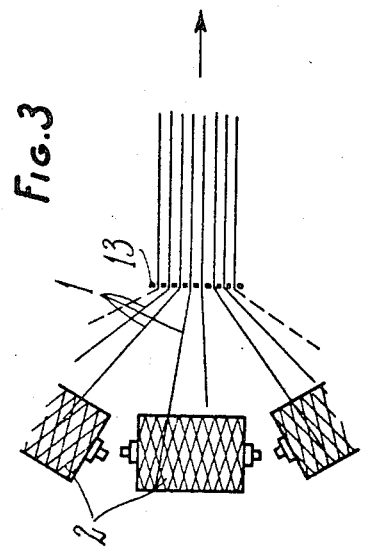

In the embodiment of the invention shown in FIGS. 2a, 2b and 3, the strands 1, unwinding from supply reels 2, pass into a thread guide 13 which arranges them in parallel before their entry into a preheating oven 14. This oven is heated by electric resistances supplied with a source of current 15 with regulation and control of the temperature by thermocouples. Circulation of air is established in the oven by a ventilator 16 carrying away the volatile products which are evacuated at 17. After leaving the preheating oven 14, the threads are gripped by control rollers 18. These rollers cooperate with control rollers 19 provided adjacent to the exit of the installation. These pulling rollers are respectively set in motion by motors 20 and 21 with a control system therefor.

The threads should enter the electrostatic vat or chamber with a minimum of mechanical tension, so that a small roller 23 is provided in contact with the sheet of threads, which acts on a potentiometer 24. The current regulated by this potentiometer, and which is a function of the tension of the sheet of threads, acts on the regulating system of motor 20 in order to maintain this tension at the desired value. Before introduction into electrostatic chamber 22, the threads are grounded at 25.

The electrostatic apparatus through which the threads travel, is constituted by vat 22 of insulating material, at the lower part of which is provided a porous plate 26. A blowpipe 27 below this plate is connected to the insulated pole of a high tension generator 28, capable of being regulated. This blowpipe transmits the high tension to metallic points 29 extending through the porous plate 26. A supply of compressed air is admitted at 30 under the porous plate to facilitate fluidization of the synthetic resin powder 31 lodging on porous plate 26 in a uniformly thick layer capable of having a depth of several centimeters. The resin powder is supplied to the vat by a distributor 32 at a proportioned flow.

The compressed air supplied to the vat through conduit 30 may be advantageously preheated to a temperature below the softening temperature of the synthetic resin. Heating this air, as the preheating of the threads in oven 14, makes possible a rapid fusing or fixation of the resin on the threads. When they leave the electrostatic vat 22, the threads, with the resin particles affixed to all the fibers thereof, pass into a spinneret 33, which may be heated electrically by a regulated source 34. This spinning nozzle effects a preliminary softening of the resin.

The threads are next conducted into a fusion and impregnation oven 35 heated by electrical resistances supplied by a source of current 36 with regulation and control of the temperature by thermocouples. This oven is provided with a circulation of air by a ventilator 37, which serves to entrain the volatile products which are evacuated at 38.

The threads then pass into a heated spinning nozzle 39, comprised of electric resistances supplied by an adjustable source of current 40. This spinneret has for its essential role the forming of the hot fiber-resin compound. In the illustrated embodiment, this spinneret shapes the agglomerated fiber and resin compound in the form of a plurality of continuous reeds. The threads, impregnated throughout and at the core with resin, traverse a cooling device which, in this example, is constituted by a tub 41 having a water level which is maintained constant by a cooling water flow 42, with the overflow escaping through openings in the tub and drain openings 43. Thereafter the continuous reeds of fibers completely impregnated with resin, pass between control rollers 19 and are cut into small bits or granules by a granulator 45, the length of the cut being regulatable, as is well known in the art.

The apparatus described above operates as follows:

When high tension is applied, in the insulating vat or chamber 22, an electrostatic field is generated and the threads passing continuously through this vat become highly charged, this charge being of opposite sign relative to that of the resin powder 31 which is in suspension in the chamber and which is electrified by metallic points 29. The penetration of the powder into the assemblies of threads and the separated fibers is encouraged by the fact that the fibers, being charged with the same sign, repel one another.

It is very important that the tension of the assemblies of thread in the chamber 22 be very weak. For this purpose, the pulling system 18 is started with a time advance over the pulling system 19; hence the threads exhibit a minimum tension between the pulling system 18 and the spinning nozzle 33. In spite of the dependent relation between the pulling systems, the speeds of rollers 18 and 19 are never strictly identical, which renders necessary the use of the tension regulator 24 controlled by roller 23. While the threads have a tendency to increase the tension, this device causes a slight acceleration of the pulling system 18.

Instead of using a spinning nozzle such as 33 and an oven such as 35 for the fusion of the resin and impregnation of the threads or strands and the formation of the reeds, other means may be used for such purposes, particularly those shown in FIGS. 4 and 5. In the embodiment of FIG. 4, the threads or strands leaving electrostatic chamber 22 pass into a spinneret 50 of great length heated by electrical resistances or by a circulation of fluid. This spinneret may possibly comprise several zones of different temperatures for effecting a heating and then cooling. In the embodiment shown in FIG. 5, the threads or strands issuing from the electrostatic chamber 22 pass between two heated endless bands or belts 51, which are driven continuously by means of a motor 52. These two embodiments are particularly interesting because they make possible a rapid fusion of the powdered synthetic resin while eliminating the problems of ventilation in the oven. They are also particularly well adapted for utilization in a vertical installation, such as, for example, the one which is described below.

FIG. 6 illustrates a variant of the preceding embodiment, according to which a vertical arrangement is adopted for carrying the strands to pulling rollers 18, 19, for their passage into electrostatic vat or chamber 22, then into the fusion and impregnation oven, and finally through the cooling and cutting devices. In this figure, the same members as described previously are designated with the same reference characters. The installation comprises an elongated fusion and shaping oven 50 arranged as shown in FIG. 4. The cooling device is constituted by an enclosure 46 cooled by a circulation of water. There is also provided a reversing roller 47 for directing the strands downwardly into the electrostatic vat or chamber 22, and rollers 48 to assure tightness of the passage of the strands.

The quantity of powdered synthetic resin deposited on the fibers depends essentially on the following factors: the positioning of the assemblies of threads with respect to the electrode; the tension applied; the speed of passage of the threads; and the granulometry of the resin.

Below are given examples of modes of practicing the methods of the invention, applied more particularly to glass threads or strands:

Temperature of preheating of the glass

The fusion temperatures of the thermoplastics which are used are generally in the zone of 150° C.–300° C.; therefore, it is desirable to preheat the threads to a temperature falling within this range. It is well understood that this range of temperatures is not limiting. It may be particularly interesting to bring the threads to a temperature whereat are substantially eliminated those constituents of their oiling which might be harmful to adherence characteristics between the glass and thermoplastic components; (for example: polyvinyl acetate in the case of the polyamides). The preheating temperature may be, in the case of polypropylene, 240° C. and, in the case of polystyrene, 200° C.

Rate of fiberizing or separation of the fibers from each other

This speed may, in general, be of the order of 40 meters per minute. It may well be higher or lower. Good results have been obtained with a speed of fiberizing of 25 meters per minute for polystyrene and 20 meters per minute for polypropylene.

Voltage potentials of the electrostatic generator

By way of example, the following voltages may be utilized: 25,000 volts in the case of polypropylene; 35,000 volts in the case of polystyrene.

Theoretically, the charges which the glass fibers should take would be close to the voltage delivered by the generator. However, practically, these charges are weaker because of certain limiting factors such as, for example, the oiling of the fibers may reduce the assumed charge by about ten thousand volts.

Temperatures of spinnerets and oven

The temperatures of the spinning nozzles or spinnerets, such as 33, 39 are of the order of 250° C., while those of oven 35 depend narrowly on the speed of the passage of the threads. The greater the latter, the higher the temperature of the oven can be raised; however, it is indispensable that the temperature of the composite glass-resin compounds never exceeds at any time the temperature of decomposition of the resin. This decomposition temperature for polypropylene is at about 300° C., and for polystyrene at about 280° C. With these considerations in mind, the following characteristics may be adopted: length of oven: 5 meters; temperature of oven: for polypropylene—380° C., for polystyrene—340° C., for speeds, respectively, of 20 meters per minute and 25 meters per minute, it being understood that at these speeds, the glass threads leave the oven at temperatures lower than decomposition temperatures of these resins.

Tension of threading

This mechanical tension of the threads in the electrostatic chamber may be comprised, for example, between 10 and 200 g. according to the capacity of the assembly.

Distance of the threads or strands above the powder in the electrostatic chamber This distance may be 20 cm. for polypropylene and 15 cm. for polystyrene with above indicated voltages of the electrostatic generator and travel speeds of the strands.

Granulometry of the resins

In general, synthetic resins will be used, the dimensions of the particles of which are lower than 300 microns, it being understood that it will be advantageous, whenever the resins used will permit it, to use finer particles, for example, of 100 microns or less.

We claim:
1. The method of fabricating short lengths of substantially rigid reeds of fibers agglomerated by binders for the reenforcement of molded plastic articles, which comprises
   (a) feeding threads or wicks of hardened thermoplastic fibers from a source of supply,
   (b) reducing the tractive tension exerted on the threads at a stage of the travel thereof as they are pulled from said source of supply,
   (c) separating the individual fibers of each thread from each other by electrostatic repulsion forces, to increase their mutual exposure at said stage of their travel under low tension,
   (d) applying to the individual freely exposed fibers a synthetic resin in dry powdered form by electrostatic force by charging the powdered resin with a charge exerting an attraction for the electrostatically charged fibers, said dry powdered synthetic resin having a lower softening point than said thermoplastic fibers,
   (e) fusing the resin onto said fibers immediately following its application to the latter,
   (f) thereafter shaping and cooling the combined agglomerated fibers and resin in the form of continuous substantially solid reeds of small cross-section as they are pulled from said source of supply and through said stage under reduced tension, and
   (g) cutting the cooled shaped reeds of agglomerated fibers and resin into small lengths of adjustable size.

2. The method set forth in claim 1, wherein the dry powdered resin is of a granulometry ranging from less than 100 to 300 microns in diameter and is charged with an electrostatic potential of opposite polarity of that applied to the threads which gives rise to the repulsion forces between the fibers.

3. The method set forth in claim 2, wherein the synthetic resin in dry powdered form is selected from the group consisting of vinyl polymers such as polystyrene, the copolymers of styrene and other monomers, in particular acrylonitrile and butadiene, high and low pressure polyethylenes, polypropylene and the copolymers of propylene and ethylene, polyvinyl chloride and the copolymers of vinyl chloride, methyl polymethacrylate and the copolymers of the methacrylic and acrylic esters; the products of polyaddition or polycondensation such as the polyamides, for example, polycaprolactame or the homopolymers and copolymers of other lactames, hexamethylenediamine, the polycarbonates, polyphenylene oxide, and cellulosic derivatives such as cellulose acetate.

4. The method set forth in claim 2, wherein the synthetic resin in dry powdered form is heat-hardenable and is selected from the group consisting of aminoplasts, phenoplasts, epoxides and alkyd resins.

References Cited

UNITED STATES PATENTS

| | | | |
|---|---|---|---|
| 758,243 | 4/1904 | Goldman | 117—21 |
| 2,441,492 | 5/1948 | Koon et al. | 117—21 |
| 2,820,716 | 1/1958 | Harmon et al. | 117—21 |
| 3,244,570 | 4/1966 | Boggs | 117—65.2 |
| 3,291,878 | 12/1966 | Boggs | 264—137 |
| 3,473,512 | 10/1969 | Wood | 118—405 |
| 3,501,562 | 3/1970 | Onoyama | 264—137 |
| 3,340,083 | 9/1967 | Robitschek | 117—126 GR |
| 2,774,680 | 12/1956 | Hackney et al. | 117—17 |
| 2,306,400 | 12/1942 | Menzel | 117—21 |
| 2,686,141 | 8/1954 | Sawyer | 117—17 |
| 2,877,501 | 3/1959 | Bradt | 117—4 |
| 2,815,761 | 12/1957 | Shearer | 117—16 |
| 3,235,530 | 2/1966 | Crouch et al. | 117—140 R |

FOREIGN PATENTS

| | | | |
|---|---|---|---|
| 560,663 | 7/1958 | Canada | 264—137 |
| 641,434 | 11/1964 | Netherlands | 264—137 |

OTHER REFERENCES

Def. Pub., Morrison et al., Mar. 18, 1969.

MURRAY KATZ, Primary Examiner

W. R. TRENOR, Assistant Examiner

U.S. Cl. X.R.

117—4, 17, 93.4, 126 GB, 140 R; 118—100, 125, 308, 621; 264—95, 137; 161—170